United States Patent
Cho et al.

(10) Patent No.: US 10,845,929 B2
(45) Date of Patent: Nov. 24, 2020

(54) METHOD FOR FABRICATING TOUCH PANEL

(71) Applicant: Samsung Display Co., Ltd., Gyeonggi-do (KR)

(72) Inventors: Ki-hyun Cho, Hwaseong-si (KR); Seungrok Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/542,438

(22) Filed: Aug. 16, 2019

(65) Prior Publication Data

US 2019/0369777 A1 Dec. 5, 2019

Related U.S. Application Data

(62) Division of application No. 15/468,076, filed on Mar. 23, 2017, now Pat. No. 10,416,819.

(30) Foreign Application Priority Data

Mar. 24, 2016 (KR) ........................ 10-2016-0035466

(51) Int. Cl.
*G06F 3/041* (2006.01)
*G06F 3/044* (2006.01)

(52) U.S. Cl.
CPC .... *G06F 3/044* (2013.01); *G06F 2203/04103* (2013.01); *G06F 2203/04111* (2013.01); *G06F 2203/04112* (2013.01)

(58) Field of Classification Search
CPC ............................................ G06F 2203/04103
See application file for complete search history.

(56) References Cited

U.S. PATENT DOCUMENTS

2013/0136949 A1 5/2013 Okuno et al.
2015/0042598 A1 2/2015 Chae
(Continued)

FOREIGN PATENT DOCUMENTS

KR   10-2013-0063535   6/2013
KR   10-1303511        9/2013
(Continued)

OTHER PUBLICATIONS

Non-Final Office Action dated Oct. 2, 2018, in U.S. Appl. No. 15/468,076.

(Continued)

*Primary Examiner* — Roy P Rabindranath
(74) *Attorney, Agent, or Firm* — H.C. Park & Associates, PLC

(57) ABSTRACT

A method for fabricating a touch panel includes: providing a silver nano wire layer; providing first organic patterns and second organic patterns on the silver nano wire layer; providing a metal layer on the first organic patterns and the second organic patterns; forming a first bridge layer, first sensing electrodes, and second sensing electrodes by etching the metal layer and the silver nano wire layer; providing a transparent conductive oxide layer on the first organic patterns, the second organic patterns, the first bridge layer, the first sensing electrodes, and the second sensing electrodes; and forming a second bridge layer by etching the transparent conductive oxide layer.

6 Claims, 10 Drawing Sheets

(56) References Cited

U.S. PATENT DOCUMENTS

| | | | |
|---|---|---|---|
| 2015/0189737 A1 | 7/2015 | Lee et al. | |
| 2015/0253810 A1* | 9/2015 | Shin .................. | H03K 17/9622 |
| | | | 345/174 |
| 2015/0292963 A1 | 10/2015 | Kawamura et al. | |
| 2016/0195987 A1 | 7/2016 | Lin et al. | |

FOREIGN PATENT DOCUMENTS

| | | |
|---|---|---|
| KR | 10-1428006 | 8/2014 |
| KR | 10-2017-0014039 | 2/2017 |

OTHER PUBLICATIONS

Notice of Allowance dated May 7, 2019, in U.S. Appl. No. 15/468,076.

* cited by examiner

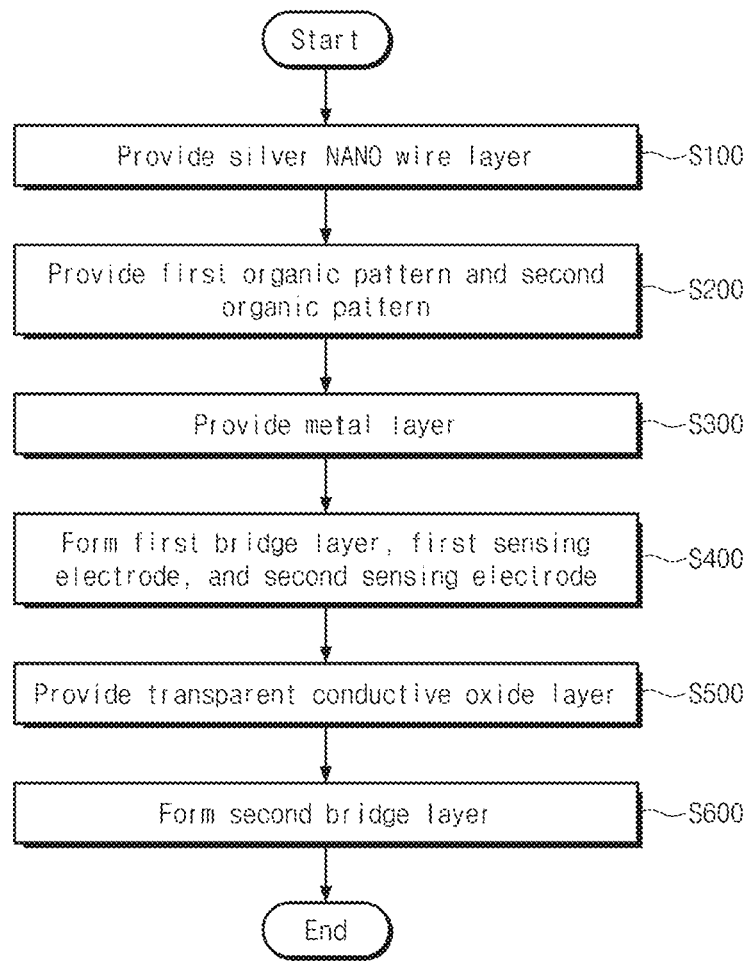

METHOD FOR FABRICATING TOUCH PANEL

CROSS-REFERENCE TO RELATED APPLICATION

This application is a Division of U.S. patent application Ser. No. 15/468,076, filed Mar. 23, 2017, which claims priority from and the benefit of Korean Patent Application No. 10-2016-0035466, filed on Mar. 24, 2016, which is hereby incorporated by reference for all purposes as if fully set forth herein.

BACKGROUND

Field

Exemplary embodiments relate to a touch panel and a method for fabricating the same, and more particularly, to a touch panel having a simplified fabrication process and improved reliability, and a method for fabricating the same.

Discussion of the Background

A touch panel is an input unit through which a user may contact an item displayed on an image display device with the user's hand or an object to input a user's command. The touch panel is disposed on a front surface of the image display device to convert a position information of the directly or indirectly contact of the person's hand or the object into an electrical signal. The item displayed at the contact position may be received as an input signal.

The touch panel may have wide range of applications since the touch panel may be connected to a display panel to substitute for other input units, such as a keyboard and a mouse. The touch panel may include a resistive overlay touch panel, a photosensitive touch panel, and a capacitive touch panel according to an implementation method thereof. With the capacitive touch panel, when the user or the object directly or indirectly contacts the capacitive touch panel, the conductive sensing electrode may sense a change in capacitance generated between a conductive sensing electrode and the adjacent sensing electrode or ground electrode to convert the contact position information into an electrical signal.

The above information disclosed in this Background section is only for enhancement of understanding of the background of the inventive concept, and, therefore, it may contain information that does not form the prior art that is already known in this country to a person of ordinary skill in the art.

SUMMARY

The present disclosure provides a touch panel that has improved reliability and can be manufactured in a simplified manner.

The present disclosure provides a method for fabricating a touch panel with improved reliability in a process that simplifies fabrication.

Additional aspects will be set forth in the detailed description which follows, and, in part, will be apparent from the disclosure, or may be learned by practice of the inventive concepts.

According to an exemplary embodiment, a touch panel may include: first sensing electrodes arranged spaced apart from each other in a first direction and a second direction crossing the first direction, each of the first sensing electrodes including a silver nano wire; second sensing electrodes arranged spaced apart from the first sensing electrodes and arranged spaced apart from each other in the first and second directions, each of the second sensing electrodes including a silver nano wire; first organic patterns disposed on the first sensing electrodes, each of the first organic patterns including at least one contact hole; second organic patterns disposed on the second sensing electrodes; and bridges respectively connecting two first sensing electrodes adjacent in the first direction, the bridges disposed on a portion of each of the two first sensing electrodes and contacting the two first sensing electrodes through the contact holes, wherein each of the bridges includes: a first bridge layer including a metal, the first bridge layer overlapping the contact hole; and a second bridge layer including a transparent conductive oxide, the second bridge layer partially overlapping the first bridge layer, disposed on the first bridge layer and the first organic patterns, and not overlapping the second organic patterns.

The first organic patterns may not overlap the second organic patterns in a planar view.

The touch panel may further include connection parts respectively connecting two second sensing electrodes adjacent in the second direction, the connection parts may be integrated with the second sensing electrodes.

The touch panel may further include third organic patterns respectively disposed on the connection parts, the third organic patterns may be integrated with the second organic patterns.

The second bridge layer may be disposed on the first bridge layer, the first organic patterns, and the third organic patterns, and the second bridge layer may not overlap with the second organic patterns.

Each of the first sensing electrodes may include: a first sensing part including the silver nano wire; and a first non-sensing part may be free of the silver nano wire, the first non-sensing part connected to the first sensing part.

The first non-sensing part may surround the first sensing part in a planar view.

Each of the second sensing electrodes may include: a second sensing part including the silver nano wire; and a second non-sensing part may be free of the silver nano wire, the second non-sensing part connected to the second sensing part.

The second non-sensing part may surround the second sensing part in a planar view.

The first bridge layer may overlap a portion of each of the first sensing electrodes, and may not overlap with the second sensing electrodes and the connection parts in a planar view.

The first bridge layer may overlap a portion of each of the first organic patterns, and may not overlap with the second organic patterns and the third organic patterns in a planar view.

The second bridge layer may include: a first bridge part overlapping the first bridge layer; and a second bridge part connected to the first bridge part, the second bride part may not overlap with the first bridge layer.

The second bridge part may contact the first bridge part, the first organic patterns, and the third organic patterns.

According to an exemplary embodiment, a method for fabricating a touch panel may include: providing a silver nano wire layer; providing first organic patterns and second organic patterns on the silver nano wire layer; providing a metal layer on the first organic patterns and the second organic patterns; forming a first bridge layer, first sensing electrodes, and second sensing electrodes by etching the metal layer and the silver nano wire layer; providing a transparent conductive oxide layer on the first organic patterns, the second organic patterns, the first bridge layer, the first sensing electrodes, and the second sensing electrodes; and forming a second bridge layer by etching the transparent conductive oxide layer.

The metal layer and the silver nano wire layer may be etched through a single etching process.

The providing of the first organic patterns and the second organic patterns may include: providing an organic layer; providing a first photoresist layer on the organic layer; etching the first photoresist layer using a first mask to form first photoresist patterns; and etching the organic layer using the first photoresist patterns as a mask to form the first organic patterns and the second organic patterns.

The forming of the first bridge layer, the first sensing electrodes, and the second sensing electrodes may include: providing a second photoresist layer on the metal layer; etching the second photoresist layer using a second mask to form second photoresist patterns; and etching the metal layer and the transparent conductive oxide layer using the second photoresist patterns as a mask to form the first bridge layer, the first sensing electrodes, and the second sensing electrodes.

The forming of the second bridge layer may include: providing a third photoresist layer on the transparent conductive oxide layer; etching the third photoresist layer using a third mask to form third photoresist patterns; and etching the transparent conductive oxide layer using the third photoresist patterns as a mask to form the second bridge layer.

In the forming of the first bridge layer, the first sensing electrodes, and the second sensing electrodes, each of the first sensing electrodes may correspond to each of the first organic patterns, and each of the second sensing electrodes may correspond to each of the second organic patterns.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 4 is a schematic flowchart illustrating a method for fabricating a touch panel according to an exemplary embodiment.

DETAILED DESCRIPTION OF THE ILLUSTRATED EMBODIMENTS

Figure 1:
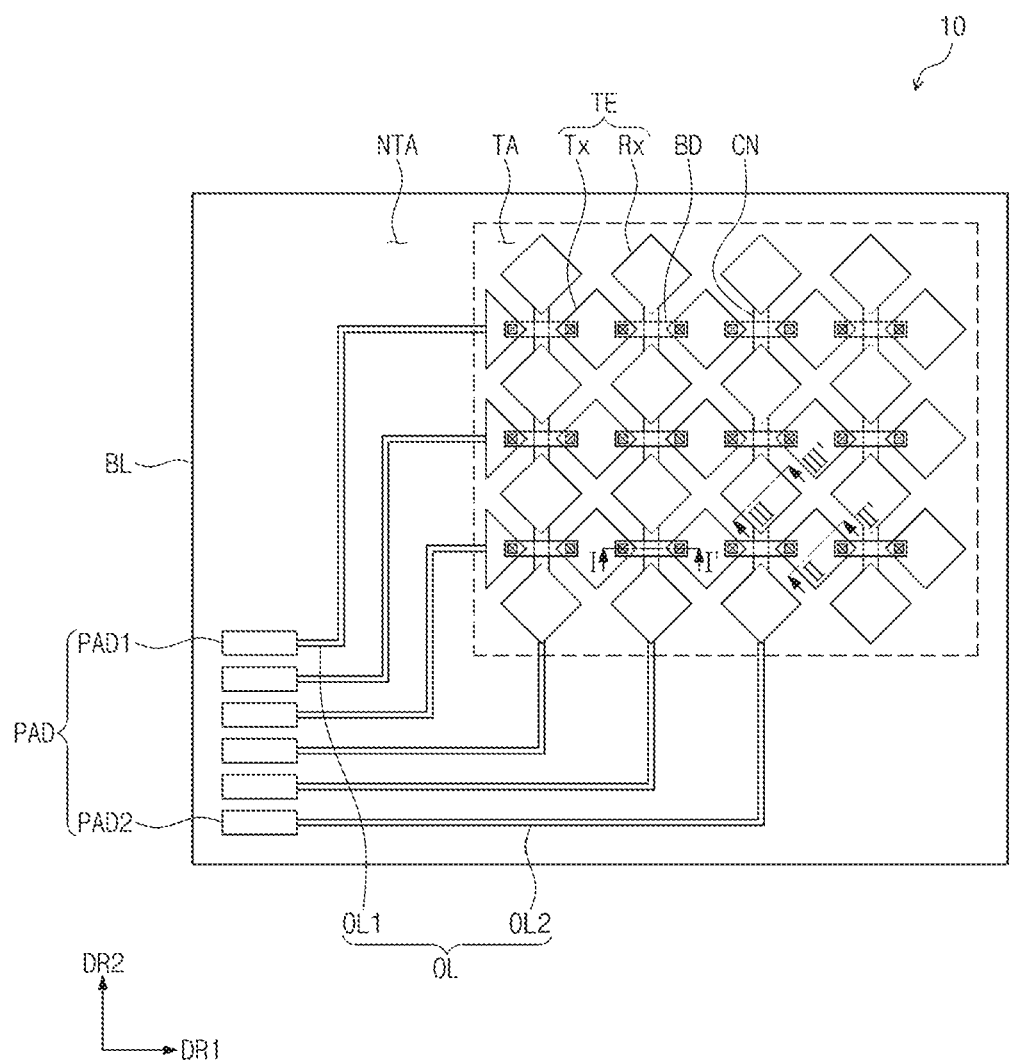
FIG. 1 is a schematic plan view of a touch panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a schematic plan view of a touch panel according to an exemplary embodiment.

Referring to FIG. 1, a touch panel 10 according to an exemplary embodiment may recognize at least one of; a direct touch of a user, an indirect touch of the user, a direct touch of an object, and an indirect touch of the object. The direct touch may refer to the user or the object directly contacting the touch panel 10. The indirect touch may refer to the touch panel 10 recognizing the user or the object positioned in proximity at a distance that are not directly touching the touch panel 10.

The touch panel 10 according to an exemplary embodiment may be applied to display devices including a liquid crystal display (LCD) panel, a field emission display (FED) panel, a plasma display panel (PDP), and an organic electroluminescence device (EL). Here, the touch panel 10 according to an exemplary embodiment may be connected to a display panel by using an adhesive or an adhesive agent or continuously connected to the display panel by using the uppermost layer of the display panel (for example, an encapsulation layer for protecting an organic layer including a light emitting layer in an organic field emission display panel) as a base layer BL.

The touch panel 10 according to an exemplary embodiment includes a base layer BL, first sending units, second sensing units, a pad unit PAD, and an outer line OL. A sensing electrode TE includes first sensing electrodes Tx and second sensing electrodes Rx.

The first sensing units extend in a first direction DR1 and are disposed spaced apart from each other in a second direction DR2. The first sensing units include the first sensing electrodes Tx and bridges BD.

The second sensing units extend in the second direction DR2 and are spaced apart from each other in the first direction DR1. The second sensing units include the second sensing electrodes Rx and connection parts CN.

External touch may be inputted through the base layer BL. The base layer BL may transmit light therethrough and have the form of a transparent conductive film. The exemplary embodiments are not specifically limited, and any material that may be commonly used to form the base layer BL may be included. For example, the base layer BL may include at least one of plastic, glass, a polymer, an organic compound, and an inorganic compound. The base layer BL may have a plate shape. Also, the base layer BL may be a thin film encapsulation layer for protecting an organic layer including a light emitting layer and be provided as a separate substrate in an organic electroluminescent device.

The base layer BL includes a touch non-recognition area NTA and a touch recognition area TA. The touch non-recognition area NTA does not recognize external touch. For example, the touch non-recognition area NTA may surround the touch recognition area TA. The touch recognition area TA recognizes the external touch. The touch recognition area TA may have a substantially rectangular shape, but the exemplary embodiments are not limited thereto.

A pad unit PAD and the outer line OL may be disposed on the touch non-recognition area NTA. Referring to FIG. 1, the pad unit PAD is disposed at a left side of the touch recognition area TA, but the exemplary embodiments are not limited thereto. For example, the pad unit PAD may be disposed at various positions such as right, upper, and lower sides of the touch recognition area TA in the planar view.

The pad unit PAD is electrically connected to the sensing electrode TE. The pad unit PAD is disposed on the base layer BL. The pad unit PAD may include first pad units PAD1 and second pad units PAD2.

The first pad units PAD1 are electrically connected to the first sensing electrodes Tx. The first pad units PAD1 may be electrically connected to the first sensing electrode Tx disposed on one end of each rows of the first sensing electrodes Tx extending in the first direction DR1. Referring to FIG. 1, the first pad units PAD1 are electrically connected to the first sensing electrode Tx, disposed on one end of each rows of the first sensing electrodes Tx extending in the first direction DR1, but the exemplary embodiments are not limited thereto. For example, the first pad units PAD1 may be electrically connected to the first sensing electrodes Tx disposed on both ends of each rows of the first sensing electrodes Tx extending in the first direction DR1.

The second pad units PAD2 are electrically connected to the second sensing electrodes Rx. The second pad units PAD2 may be electrically connected to the second sensing electrode Rx disposed on one end of each columns of the second sensing electrodes Rx extending in the second direction DR2. Referring to FIG. 1, the second pad units PAD2 are electrically connected to the second sensing electrode Rx, disposed on one end of each columns of the second sensing electrodes Rx extending in the second direction DR2, but the exemplary embodiments are not limited thereto. For example, the second pad units PAD2 may be electrically connected to the second sensing electrodes Rx disposed on both ends of each columns of the second sensing electrodes Rx extending in the second direction DR2.

The outer line OL connects the sensing electrode TE to the pad unit PAD. The outer line OL is disposed on the base layer BL. The outer line OL may include first outer lines OL1 and second outer lines OL2.

The first outer lines OL1 connect the first sensing electrodes Tx to the first pad units PAD1. The first sensing electrode Tx disposed on one end of each rows of the first sensing electrodes Tx extending in the first direction DR1 is connected to the first outer lines OL1 and electrically connected to the first pad units PAD1. Referring to FIG. 1, the first sensing electrode Tx disposed on one end of each rows of the first sensing electrodes Tx extending in the first direction DR1 is connected to the first outer lines OL1 and electrically connected to the first pad units PAD1, the exemplary embodiments are not limited thereto. For example, the first sensing electrodes Tx disposed on both ends of each rows of the first sensing electrodes Tx extending in the first direction DR1 may be connected to the first outer lines OL1 and electrically connected to the first pad units PAD1.

The second outer lines OL2 connect the second sensing electrodes Rx to the second pad units PAD2. The second sensing electrode Rx disposed on one end of each columns of the second sensing electrodes Rx extending in the second direction DR2 is connected to the second outer lines OL2 and electrically connected to the second pad units PAD2. Referring to FIG. 1, the second sensing electrode Rx, disposed on one end of each columns of the second sensing electrodes Rx extending in the second direction DR2 is connected to the second outer lines OL2 and electrically connected to the second pad units PAD2, the exemplary embodiments are not limited thereto. For example, the second sensing electrodes Rx disposed on both ends of the second sensing electrodes Rx extending in the second direction DR2 may be connected to the second outer lines OL2 and electrically connected to the second pad units PAD2.

The sensing electrode TE may be disposed on the touch recognition area TA. First sensing units and second sensing units may be disposed on the touch recognition area TA. An input of the external touch by the sensing electrode TE is recognized on the touch recognition area TA. When the external touch is applied by the touch by the hand or object, a capacitance between the sensing electrodes TE, e.g., the first sensing electrodes Tx and the second sensing electrodes Rx of the sensing electrode TE may change. According to the change of the capacitance, a sensing signal applied to the first sensing electrodes Tx may be delayed and transmitted to the second sensing electrodes Rx. The touch panel 10 may sense touch coordinates from the delay in the sensing signal.

Figure 2A:
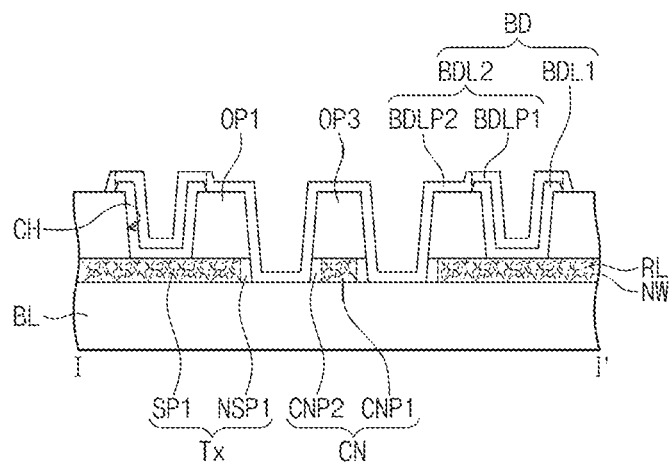
FIG. 2A is a schematic cross-sectional view taken along a sectional line I-I' of FIG. 1.
Figure 2B:
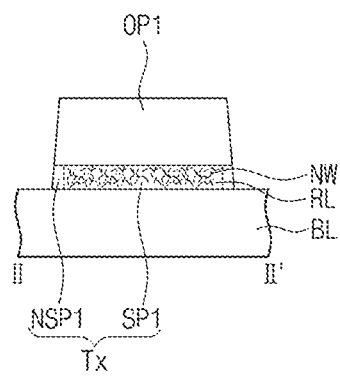
FIG. 2B is a schematic cross-sectional view taken along a sectional line II-II' of FIG. 1.
Figure 2C:
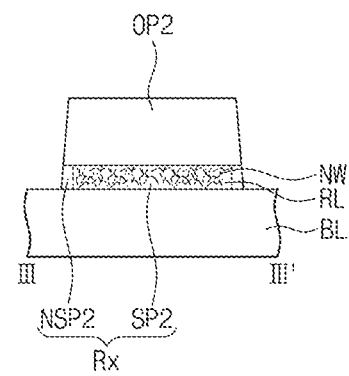
FIG. 2C is a schematic cross-sectional view taken along a sectional line III-III' of FIG. 1.
Figure 3A:
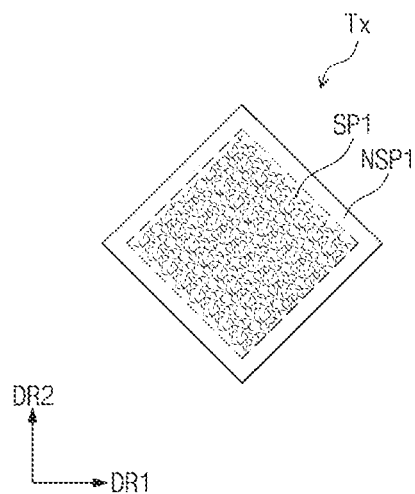
FIG. 3A is a schematic cross-sectional view of first sensing electrodes according to an exemplary embodiment.
Figure 3B:
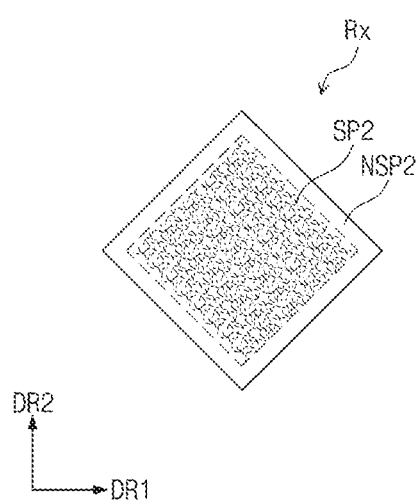
FIG. 3B is a schematic cross-sectional view of second sensing electrodes according to an exemplary embodiment.

FIG. 2A is a schematic cross-sectional view taken along a sectional line I-I' of FIG. 1. FIG. 2B is a schematic cross-sectional view taken along a sectional line II-II' of FIG. 1. FIG. 2C is a schematic cross-sectional view taken along a sectional line III-III' of FIG. 1. FIG. 3A is a schematic cross-sectional view of the first sensing electrodes according to an exemplary embodiment. FIG. 3B is a schematic cross-sectional view of the second sensing electrodes according to an exemplary embodiment.

Referring to FIGS. 1, 2A, 2B, and 2C, the sensing electrode TE is disposed in the form of a matrix having a plurality of rows extending in the first direction DR1 and a plurality of columns extending in the second direction DR2. The sensing electrode TE includes first sensing electrodes Tx and second sensing electrodes Rx. The first sensing electrodes Tx and the second sensing electrodes Rx may be electrically insulated from each other. Each of the first sensing electrodes Tx and the second sensing electrodes Rx may have various shapes such as a diamond shape, a square shape, a rectangular shape, a circular shape, or an irregular shape (e.g., a shape in which tree branches are interlaced such as a dendrite structure).

The first sensing electrodes Tx are arranged to be spaced apart from each other in the first direction DR1 and the second direction DR2 crossing the first direction DR1. The first sensing electrodes Tx spaced apart from each other in the first direction DR1 are connected to each other by the bridges BD.

Each of the first sensing electrodes Tx includes a resin layer RL and a silver nano wire NW included in the resin layer RL. Each of the first sensing electrodes Tx includes a first sensing part SP1 and a first non-sensing part NSP1. The first sensing part SP1 includes the silver nano wire NW. The first non-sensing part NSP1 is connected to the first sensing part SP1. The first non-sensing part NSP1 does not include the silver nano wire NW. That is, the first non-sensing part NSP1 is composed of the resin layer RL. Referring to FIG. 3A, the first non-sensing part NSP1 may surround the first sensing part SP1 in the planar view. Referring to FIG. 3A, the first sensing part SP1 may have a diamond shape in the planar view, and the first non-sensing part NSP1 may have a diamond ring shape in the planar view surrounding the first sensing part SP1.

Referring again to FIGS. 1, 2A, 2B, and 2C, the second sensing electrodes Rx are arranged to be spaced apart from each other in the first direction DR1 and the second direction DR2. The second sensing electrodes Tx spaced apart from each other in the second direction DR2 are connected to each other by the connection parts CN.

Each of the second sensing electrodes Rx includes a resin layer RL and a silver nano wire NW included in the resin layer RL. Each of the second sensing electrodes Rx includes a second sensing part SP2 and a second non-sensing part NSP2. The second sensing part SP2 includes the silver nano wire NW. The second non-sensing part NSP2 is connected to the second sensing part SP2. The second non-sensing part NSP2 does not include the silver nano wire NW. That is, the second non-sensing part NSP2 is composed of the resin layer RL. Referring to FIG. 3B, the second non-sensing part NSP2 may surround the second sensing part SP2 in the planar view. Referring to FIG. 3B, the second sensing part SP2 may have a diamond shape in the planar view, and the second non-sensing part NSP2 may have a diamond ring shape in the planar view surrounding the second sensing part SP2.

Referring again to FIGS. 1, and 2A, 2B, 2C, the bridges BD connect the first sensing electrodes Tx spaced apart from each other in the first direction DR1 to each other. The first sensing electrodes Tx spaced apart from each other in the first direction DR1 may transmit and receive a signal therebetween by the bridges BD.

Each of the bridges BD connects two adjacent first sensing electrodes Tx spaced apart from each other in the first direction DR1. The term "adjacent to each other" may mean a state in which a distance therebetween is minimized.

Each of the bridges BD includes a first bridge layer BDL1 and a second bridge layer BDL2. The first bridge layer BDL1 overlaps a contact hole CH. The first bridge layer BDL1 includes a metal. The exemplary embodiments are not specifically limited thereto, and any material that may be commonly used to form the first bridge layer BDL1 may be included. For example, the bridge BD may include at least one of Al, Cu, Ti, Ag, Au, Pt, Mo, a silver palladium copper alloy (APC) and a silver palladium alloy (AP). The first bridge layer BDL1 may be formed through the same process of forming the first and second sensing electrodes Tx and Rx.

The first bridge layer BDL1 provided to correspond to the second bridge layer BDL2 may be visible to the user because the first bridge layer BDL1 includes an opaque metal. According to the exemplary embodiments, the touch panel may reduce a resistance value of the bridges BD by providing the first bridge layer BDL1 including a metal having low resistance compared to only providing the second bridge layer BDL2 having high resistance. Also, use of the first bridge layer BDL1 may be reduced or minimized, so the part of the bridges BD visible to the user may be reduced or minimized.

The first bridge layer BDL1 overlaps a portion of each of the first sensing electrodes Tx in planar view. The first bridge layer BDL1 is spaced apart from each of the second sensing electrodes Rx in the planar view. The first bridge layer BDL1 is spaced apart from the connection parts CN in planar view.

The first bridge layer BDL1 overlaps a portion of each of first organic patterns OP1 in the planar view. The first bridge layer BDL1 is spaced apart from each of second organic patterns OP2 in the planar view. The first bridge layer BDL1 is spaced apart from third organic patterns OP3 in the planar view.

A portion of the second bridge layer BDL2 overlaps the first bridge layer BDL1. The second bridge layer BDL2 is disposed on the first bridge layer BDL1 and the first organic patterns OP1. The second bridge layer BDL2 is disposed on the first bridge layer BDL1, the first organic patterns OP1, and the third organic patterns OP3. The second bridge layer BDL2 overlaps a portion of each of the first sensing electrodes Tx. The second bridge layer BDL2 overlaps a portion of each of the first sensing electrodes Tx in the planar view. The second bridge layer BDL2 is spaced apart from the second sensing electrodes Rx. The second bridge layer BDL2 is spaced apart from the second sensing electrodes Rx in the planar view. The second bridge layer BDL2 overlaps the connection parts CN. The second bridge layer BDL2 overlaps at least a portion of the connection parts CN in the planar view.

The second bridge layer BDL2 includes transparent conductive oxide. The exemplary embodiments are not specifically limited thereto, and any transparent conductive oxide commonly used to form the second bridge layer BDL2 may be used. For example, the transparent conductive oxide may include at least one of indium tin oxide (ITO), indium zinc oxide (IZO), and indium gallium zinc oxide (IGZO).

The second bridge layer BDL2 includes a first bridge part BDLP1 and a second bridge part BDLP2. The first bridge part BDLP1 overlaps the first bridge layer BDL1. The first bridge part BDLP1 corresponds to the first bridge layer BDL1. The first bridge part BDLP1 is disposed on the first bridge layer BDL1. The first bridge part BDLP1 overlaps a portion of each of the first organic patterns OP1. The first bridge part BDLP1 overlaps a portion of each of the first organic patterns OP1 in the planar view. The first bridge layer BDLP1 overlaps a portion of each of the first sensing electrodes Tx. The first bridge layer BDLP1 overlaps a portion of each of the first sensing electrodes Tx in the planar view. The first bridge part BDLP1 is spaced apart form the second organic patterns OP2. The first bridge part BDLP1 is spaced apart form the second organic patterns OP2 in the planar view. The first bridge part BDLP1 is spaced apart from the second sensing electrodes Rx. The first bridge part BDLP1 is spaced apart from the second sensing electrodes Rx in the planar view. The first bridge part BDLP1 is spaced apart form the third organic patterns OP3. The first bridge part BDLP1 is spaced apart form the third organic patterns OP3 in the planar view. The first bridge part BLDP1 is spaced apart from the connection parts CN. The first bridge part BLDP1 is spaced apart from the connection parts CN in the planar view.

The second bridge part BDLP2 is connected to the first bridge part BDLP1. The second bridge part BDLP2 is integrated with the first bridge part BDLP1. The second bridge part BDLP2 does not overlap the first bridge layer BDL1. The second bridge part BDLP2 does not overlap the first bridge layer BDL1 in the planar view. The second bridge part BDLP2 overlaps a portion of each of the first organic patterns OP1. The second bridge part BDLP2 overlaps a portion of each of the first organic patterns OP1 in the planar view. The second bridge layer BDLP2 overlaps a portion of each of the first sensing electrodes Tx. The second bridge layer BDLP2 overlaps a portion of each of the first sensing electrodes Tx in the planar view. The second bridge part BDLP2 is spaced apart form the second organic patterns OP2. The second bridge part BDLP2 is spaced apart form the second organic patterns OP2 in the planar view. The second bridge part BDLP2 is spaced apart from the second sensing electrodes Rx. The second bridge part BDLP2 is spaced apart from the second sensing electrodes Rx in the planar view. The second bridge part BDLP2 overlaps the third organic patterns OP3. The second bridge part BDLP2 overlaps the third organic patterns OP3 in the planar view. The second bridge part BLDP2 overlaps the connection parts CN. The second bridge part BLDP2 overlaps the connection parts CN in the planar view.

The connection parts CN connect the second sensing electrodes Rx spaced apart from each other in the second direction DR2. The second sensing electrodes Rx spaced apart from each other in the second direction DR2 may transmit and receive a signal through the connection parts CN. Each of the connection parts CN connects two adjacent second sensing electrodes Rx spaced apart from each other in the second direction DR2. Each of the connection parts CN is integrated with the second sensing electrodes Rx. Each of the connection parts CN includes a resin layer RL and a silver nano wire NW included in the resin layer RL.

Each of the connection parts CN includes a first sub connection part CNP1 and a second sub connection part CNP2. The first sub connection part CNP1 includes a resin layer RL and a silver nano wire NW in the resin layer RL. The second sub connection part CNP2 is connected to the first sub connection part CNP1. The second sub connection part CNP2 does not include the silver nano wire NW. The second sub connection part CNP2 is composed of the resin layer RL.

The touch panel 10 according to an exemplary embodiment includes the first organic patterns OP1, the second organic patterns OP2, and the third organic patterns OP3. The first organic patterns OP1, the second organic patterns OP2, and the third organic patterns OP3 may be disposed through the same process. Each of the first, second, and third organic patterns OP1, OP2, and OP3 may include polyethylene terephthalate (PET), polyethylene naphthalate (PEN), polyimide, or polyether sulfone.

The first organic patterns OP1 are disposed on the first sensing electrodes Tx, respectively. The first organic patterns OP1 correspond to the first sensing electrodes Tx, respectively. Each of the first organic patterns OP1 includes at least one contact hole CH. The first organic patterns OP1 overlap the first sensing electrodes Tx, respectively. The first organic patterns OP1 overlap the first sensing electrodes Tx in the planar view, respectively. The first organic patterns OP1 are spaced apart from the second organic patterns OP2. The first organic patterns OP1 are spaced apart from the second organic patterns OP2 in the planar view. The first organic patterns OP1 are spaced apart from the third organic patterns OP3. The first organic patterns OP1 are spaced apart from the third organic patterns OP3 in the planar view.

The second organic patterns OP2 are disposed on the second sensing electrodes Rx, respectively. The second organic patterns OP2 correspond to the second sensing electrodes Rx, respectively. The second organic patterns OP2 overlap the second sensing electrodes Rx, respectively. The second organic patterns OP2 overlap the second sensing electrodes Rx in the planar view, respectively.

The third organic patterns OP3 are disposed on the connection parts CN, respectively. The third organic patterns OP3 correspond to the connection parts CN, respectively. The third organic patterns OP1 are integrated with the second organic patterns OP2. The third organic patterns OP3 overlap the connection parts CN, respectively. The third organic patterns OP3 overlap the connection parts CN in the planar view, respectively.

A conventional touch panel does not generally include first organic patterns, second organic patterns, and third organic patterns. When the first organic patterns, the second organic patterns, and the third organic patterns are not included in the touch panel, the silver nano wire provided in the first sensing electrodes, the second sensing electrodes, and the connection parts may be inadvertently etched while forming the bridges by etching a metal layer.

The touch panel according to an exemplary embodiment includes the first organic patterns disposed on the first sensing electrodes, the second organic patterns disposed on the second sensing electrodes, and the third organic patterns disposed on the connection parts. Thus, damage to the first sensing electrodes, the second sensing electrodes, and the connection parts while forming the bridges may be prevented or reduced. Therefore, the touch panel according to an exemplary embodiment may have improved touch reliability compared to the conventional touch panel.

Hereinafter, a method for fabricating the touch panel according to an exemplary embodiment will be described. Hereinafter, the method for fabricating the touch panel according to an exemplary embodiment covers descriptions not proffered respect to the touch panel according to the exemplary embodiments illustrated in FIGS. 1, 2A, 2B, 2C, 3A, and 3B, and substantially identical descriptions may be omitted or referred back to the proffered disclosure.

FIG. 4 is a schematic flowchart illustrating a method for fabricating the touch panel according to an exemplary embodiment. FIGS. 5A, 5B, 5C, 5D, 5E, 5F, 5G, 5H, 5I, 5J, 5K, 5L, and 5M are schematic cross-sectional views sequentially illustrating the method for fabricating the touch panel according to an exemplary embodiment.

Referring to FIGS. 1, 2A, 2B, 2C, and 4, a method for fabricating the touch panel 10 according to an exemplary embodiment includes providing a silver nano wire layer NWL (S100), providing first organic patterns OP1 and second organic patterns OP2 on the silver nano wire layer NWL (S200), providing a metal layer ML on the first and second organic patterns OP1 and OP2 (S300), etching the metal layer ML and the silver nano wire layer NWL to form a first bridge layer BDL1, first sensing electrodes Tx, and second sensing electrodes Rx (S400), providing a transparent conductive oxide layer TCOL on the first organic patterns OP1, the second organic patterns OP2, the first bridge layer BDL1, the first sensing electrodes Tx, and the second sensing electrodes Rx (S500), and etching the transparent conductive oxide layer TCOL to form second bridge layer BDL2 (S600).

Figure 5A:
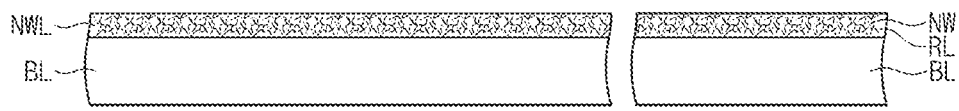
FIGS. 5A, 5B, 5C, 5D, 5E, 5F, 5G, 5H, 5I, 5J, 5K, 5L, and 5M are schematic cross-sectional views sequentially illustrating the method for fabricating the touch panel according to an exemplary embodiment.

Referring to FIGS. 4 and 5A, the silver nano wire layer NWL is disposed on a base layer BL (S100). The base layer BL may be a transmissive base layer and be a transparent conductive film. The exemplary embodiments are not specifically limited thereto, and any material that may be commonly used to form the base layer BL may be included. For example, the base layer BL may include at least one of plastic, glass, a polymer, an organic compound, and an inorganic compound. The base layer BL may have a plate shape. Also, the base layer BL may be a thin film encapsulation layer for protecting an organic layer including a light emitting layer and be provided as a separate substrate in an organic electroluminescent device.

The silver nano wire layer NWL includes a resin layer RL and a silver nano wire NW in the resin layer RL. The silver nano wire layer NWL is disposed on an entire surface of the base layer BL.

Referring to FIGS. 4 and 5B, 5C, 5D, and 5E, providing the first and second organic patterns OP1 and OP2 (S200) may include; providing an organic layer ORL, providing a first photoresist layer PRL1 on the organic layer ORL, forming the first photoresist patterns PRP1 by etching the first photoresist layer PRL1 using a first mask MSK1, and forming the first and second organic patterns OP1 and OP2 by etching the organic layer ORL using the first photoresist patterns PRP1.

Figure 5B:
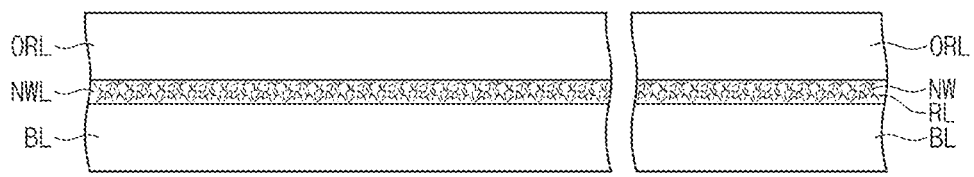

Referring to FIGS. 4 and 5B, the organic layer ORL is disposed on the silver nano wire layer NWL. The exemplary embodiments are not limited, and any material that may be commonly used to form the organic layer ORL may be included. For example, the organic layer ORL may include an organic insulation material. For example, the organic layer ORL may include at least one of polyethylene terephthalate (PET), polyethylene naphthalate (PEN), polyimide, and polyether sulfone.

Figure 5C:
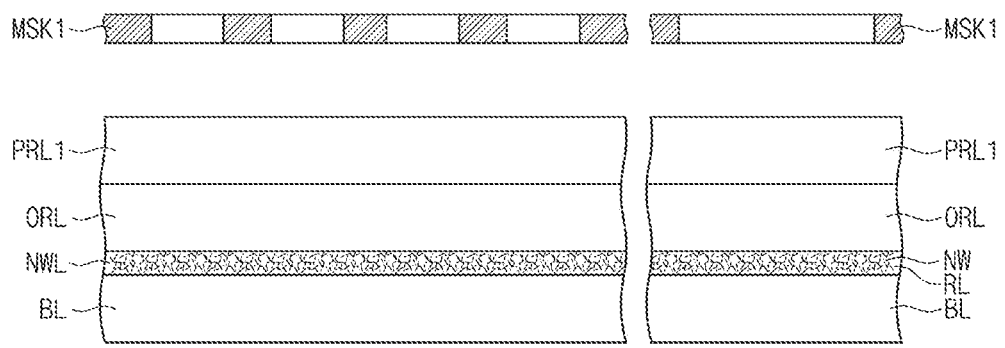

Referring to FIGS. 4 and 5C, the first photoresist layer PRL1 is disposed on the organic layer ORL. The first photoresist layer PRL1 may include photoresist material. The first mask MSK1 is disposed on the photoresist layer.

Figure 5D:
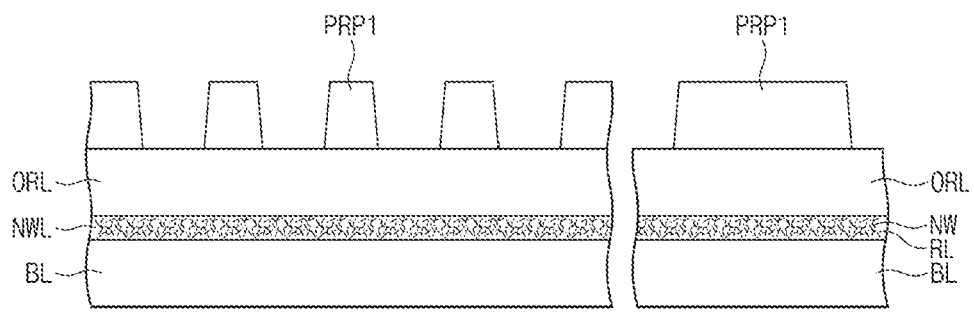

Referring to FIGS. 4 and 5D, the first photoresist layer PRL1 is exposed and developed using the first mask MSK1 to form the first photoresist patterns PRP1. The first photoresist patterns PRP1 is disposed on the organic layer ORL.

Figure 5E:
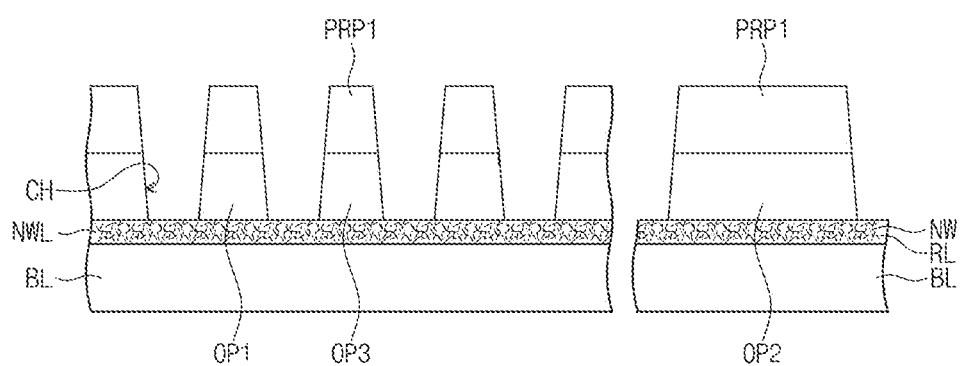

Referring to FIGS. 4 and 5E, the first organic patterns OP1, the second organic patterns OP2, and the third organic patterns OP3 are formed by using the first photoresist patterns PRP1 as a mask. The first organic patterns OP1, the second organic patterns OP2, and the third organic patterns OP3 are formed, and then, the first photoresist patterns PRP1 are removed.

Figure 5F:
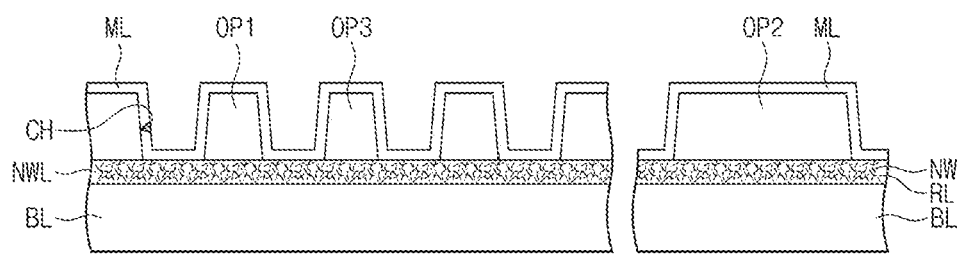

Referring to FIGS. 4 and 5f, a metal layer ML is disposed on the first and second organic patterns OP1 and OP2 (S300). The metal layer ML is also disposed on the third organic patterns OP3. The metal layer ML is disposed on the entire upper surface. The exemplary embodiments are not specifically limited, and any material that may be commonly used to form metal layer ML may be included. For example, the bridge BD may include at least one of a silver palladium copper alloy (APC) and a silver palladium alloy (AP).

Referring to FIGS. 4 and 5G, 5H, and 5I, forming the first bridge layer BDL1, the first sensing electrodes Tx, and the second sensing electrodes Rx may include; providing a second photoresist layer PRL2 on the metal layer ML, etching the second photoresist layer PRL2 using a second mask MSK2 to form second photoresist patterns PRP2, and etching the metal layer ML and the transparent conductive oxide layer TCOL by using the second photoresist patterns PRP2 as a mask to form the first bridge layer BDL1, the first sensing electrodes Tx, and the second sensing electrodes Rx (S400).

Figure 5G:
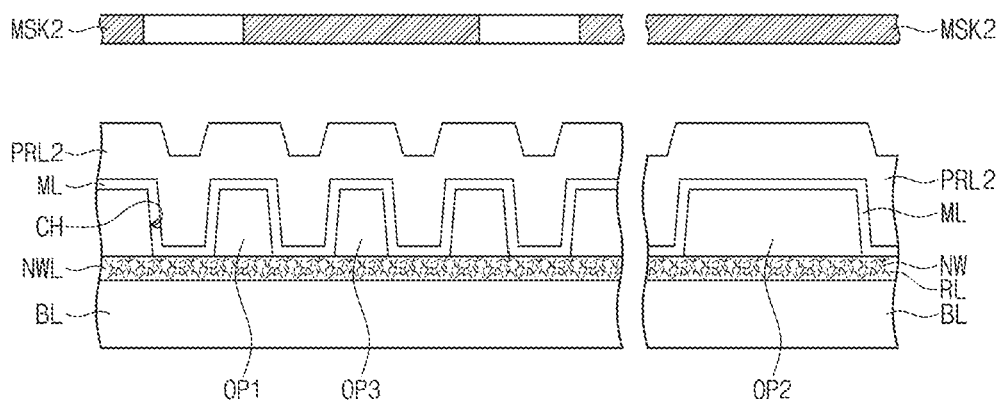

Referring to FIGS. 4 and 5G, the second photoresist layer PRL2 is disposed on the metal layer ML. The second photoresist layer PRL2 may include photoresist material. The second mask MSK2 is disposed on the photoresist layer.

Figure 5H:
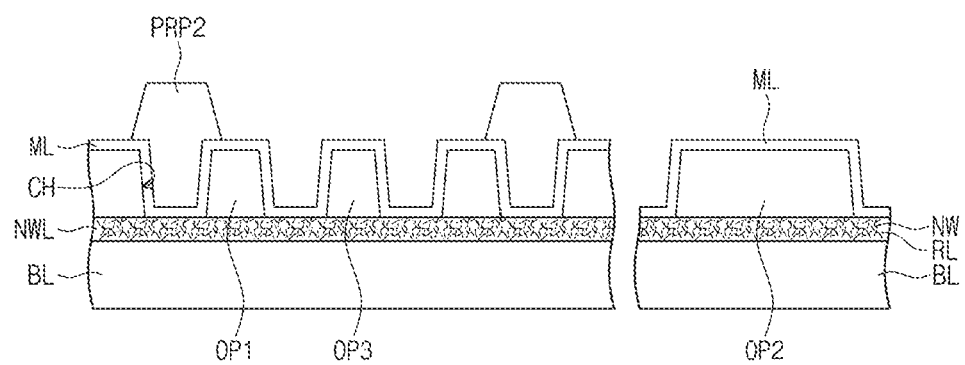

Referring to FIGS. 4 and 5H, the second photoresist layer PRL2 is exposed and developed using the second mask MSK2 to form the second photoresist patterns PRP2. The second photoresist patterns PRP2 is disposed on the metal layer ML.

Figure 5I:
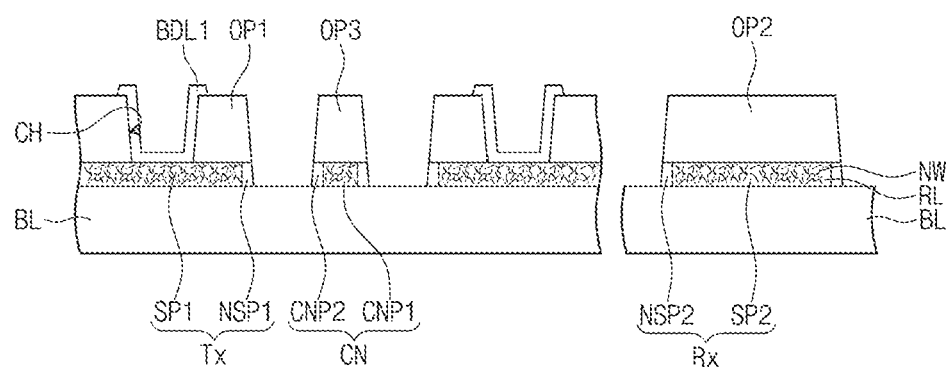

Referring to FIGS. 4 and 5I, the metal layer ML and the silver nano wire layer NWL is etched through a single etching process using the second photoresist patterns PRP2 to form the first bridge layer BDL1, the first sensing electrodes Tx, and the second sensing electrodes Rx. The first bridge layer BDL1, the first sensing electrodes Tx, the second sensing electrodes Rx, and the connection parts CN are formed by using the second photoresist patterns PRP2 as a mask. The first bridge layer BDL1, the first sensing electrodes Tx, and the second sensing electrodes Rx are formed, and, the second photoresist patterns PRP2 are removed.

Each of the first sensing electrodes Tx includes a resin layer RL and a silver nano wire NW included in the resin layer RL. Each of the first sensing electrodes Tx includes a first sensing part SP1 and a first non-sensing part NSP1. The first sensing part SP1 includes the silver nano wire NW. The first non-sensing part NSP1 is connected to the first sensing part SP1. The first non-sensing part NSP1 does not include the silver nano wire NW. The silver nano wire NW in the first non-sensing part NSP1 is removed during etching through the silver nano wire layer NWL to form the first sensing electrode Tx.

The first organic patterns OP1 are disposed on the first sensing electrodes Tx, respectively. The first organic patterns OP1 correspond to the first sensing electrodes Tx, respectively. Each of the first organic patterns OP1 includes at least one contact hole CH. The first organic patterns OP1 overlap the first sensing electrodes Tx, respectively.

Each of the second sensing electrodes Rx includes a resin layer RL and a silver nano wire NW included in the resin layer RL. Each of the second sensing electrodes Rx includes a second sensing part SP2 and a second non-sensing part NSP2. The second sensing part SP2 includes the silver nano wire NW. The second non-sensing part NSP2 is connected to the second sensing part SP2. The second non-sensing part NSP2 does not include the silver nano wire NW. The silver nano wire NW in the second non-sensing part NSP2 is removed during etching through the silver nano wire layer NWL to form the second sensing electrode Rx.

The second organic patterns OP2 are disposed on the second sensing electrodes Rx, respectively. The second organic patterns OP2 correspond to the second sensing electrodes Rx, respectively. The second organic patterns OP2 overlap the second sensing electrodes Rx, respectively.

The connection parts CN are integrated with the second sensing electrodes Rx. Each of the connection parts CN includes a resin layer RL and a silver nano wire NW included in the resin layer RL. Each of the connection parts CN includes a first sub connection part CNP1 and a second sub connection part CNP2. The first sub connection part CNP1 includes a resin layer RL and a silver nano wire NW in the resin layer RL. The second sub connection part CNP2 is connected to the first sub connection part CNP1. The second sub connection part CNP2 does not include the silver nano wire NW. The silver nano wire NW in the second sub connection part CNP2 is removed during etching through the silver nano wire layer NWL to form the connection parts CN.

The third organic patterns OP3 are disposed on the connection parts CN, respectively. The third organic patterns OP3 correspond to the connection parts CN, respectively. The third organic patterns OP1 are integrated with the second organic patterns OP2. The third organic patterns OP3 overlap the connection parts CN, respectively.

The first bridge layer BDL1 overlaps the contact holes CH provided in the first organic patterns OP1. The first bridge layer BDL1 overlaps a portion of each of the first sensing electrodes Tx. The first bridge layer BDL1 is spaced apart from each of the second sensing electrodes Rx. The first bridge layer BDL1 is spaced apart from the connection parts CN. The first bridge layer BDL1 overlaps a portion of each of organic patterns OP1. The first bridge layer BDL1 is spaced apart from the second organic patterns OP2. The first bridge layer BDL1 is spaced apart from third organic patterns OP3.

Figure 5J:
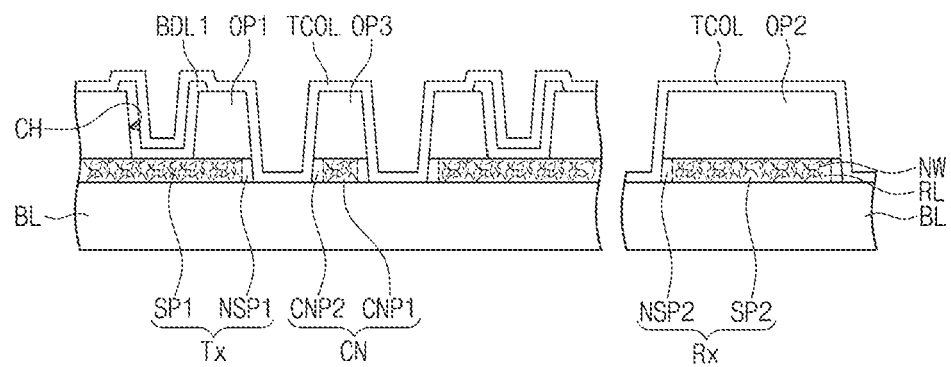

Referring to FIGS. 4 and 5J, the transparent conductive oxide layer TCOL is disposed on the first organic patterns OP1, the second organic patterns OP2, the first bridge layer BDL1, the first sensing electrodes Tx, and the second sensing electrodes Tx (S500). The exemplary embodiments are not specifically limited, and any material that may be commonly used to form the transparent conductive oxide layer TCOL may be included. For example, the transparent conductive oxide may include at least one of indium tin oxide (ITO), indium zinc oxide (IZO), and indium gallium zinc oxide (IGZO). The transparent conductive oxide layer TCOL is disposed on the entire upper surface.

Referring to FIGS. 4 and 5K, 5L, and 5M, forming the second bridge layer BDL2 may include; providing a third photoresist layer PRL3 on the transparent conductive oxide layer TCOL, etching the third photoresist layer PRL3 by using a third mask MSK3 to form third photoresist patterns PRP3, and etching the transparent conductive oxide layer TCOL by using the third photoresist patterns PRP3 as a mask to form the second bridge layer BDL2 (S600).

Figure 5K:
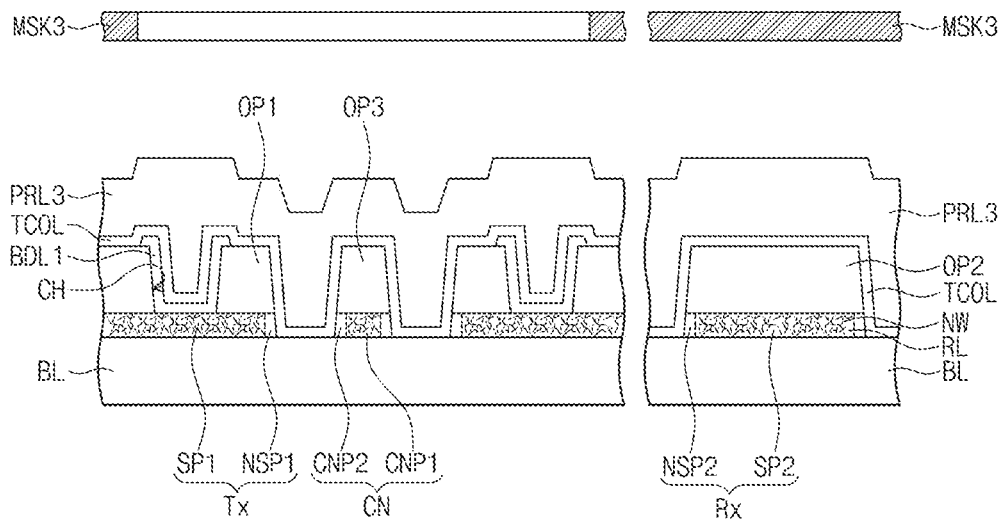

Referring to FIGS. 4 and 5K, the third photoresist layer PRL3 is disposed on the transparent conductive oxide layer TCOL. The third photoresist layer PRL3 may include photoresist material. The third mask MSK3 is disposed on the photoresist layer.

Figure 5L:
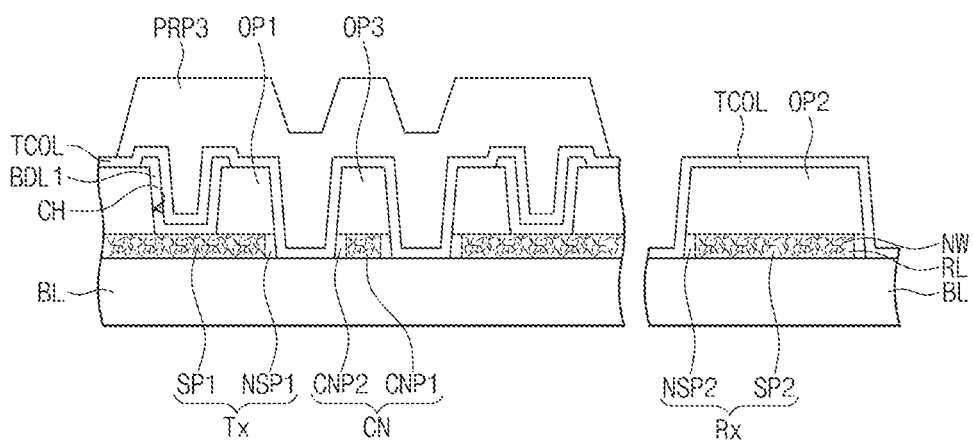

Referring to FIGS. 4 and 5L, the third photoresist layer PRL3 is exposed and developed using the third mask MSK3 to form the third photoresist patterns PRP3. The third photoresist patterns PRP3 is disposed on the transparent conductive oxide layer TCOL.

Figure 5M:
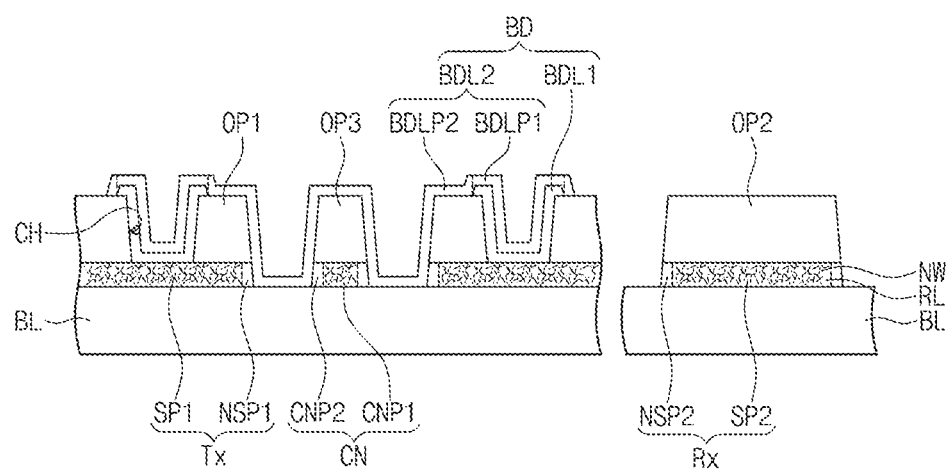

Referring to FIGS. 4 and 5M, the transparent conductive oxide layer TCOL is etched by using the third photoresist patterns PRP3 as a mask to form the second bridge layer BDL2. The second bridge layer BDL2 is formed, and then, the third photoresist patterns PRP3 are removed.

Each of the bridges BD includes a first bridge layer BDL1 and a second bridge layer BDL2. A portion of the second bridge layer BDL2 overlaps the first bridge layer BDL1. The second bridge layer BDL2 is disposed on the first bridge layer BDL1 and the first organic patterns OP1. The second bridge layer BDL2 is disposed on the first bridge layer BDL1, the first organic patterns OP1, and the third organic patterns OP3. The second bridge layer BDL2 overlaps a portion of each of the first sensing electrodes Tx. The second bridge layer BDL2 is spaced apart from the second sensing electrodes Rx. The second bridge layer BDL2 overlaps the connection parts CN.

The second bridge layer BDL2 includes a first bridge part BDLP1 and a second bridge part BDLP2. The first bridge part BDLP1 overlaps the first bridge layer BDL1. The first bridge part BDLP1 corresponds to the first bridge layer BDL1. The first bridge part BDLP1 is disposed on the first bridge layer BDL1. The first bridge part BDLP1 overlaps a portion of each of the organic patterns OP1. The first bridge layer BDLP1 overlap a portion of each of the first sensing electrodes Tx. The first bridge part BDLP1 is spaced apart form the second organic patterns OP2. The first bridge part BDLP1 is spaced apart from the second sensing electrodes Rx. The first bridge part BDLP1 is spaced apart form the third organic patterns OP3. The first bridge part BLDP1 is spaced apart from the connection parts CN.

The second bridge part BDLP2 is connected to the first bridge part BDLP1. The second bridge part BDLP2 is integrated with the first bridge part BDLP1. The second bridge part BDLP2 does not overlap the first bridge layer BDL1. The second bridge part BDLP2 overlaps a portion of each of the first organic patterns OP1. The second bridge layer BDLP2 overlap a portion of each of the first sensing electrodes Tx. The second bridge part BDLP2 is spaced apart form the second organic patterns OP2. The second bridge part BDLP2 is spaced apart from the second sensing electrodes Rx. The second bridge part BDLP2 overlaps the third organic patterns OP3. The second bridge part BLDP2 overlaps the connection parts CN.

The touch panel fabricated by a conventional method for fabricating a touch panel does not generally include first organic patterns, second organic patterns, and third organic patterns. When the first organic patterns, the second organic patterns, and the third organic patterns are not included in the touch panel, the silver nano wire provided in the first sensing electrodes, the second sensing electrodes, and the connection parts may together be etched when the metal provided in the bridges is etched.

The touch panel fabricated by the method for fabricating the touch panel according to the embodiment includes the first organic patterns disposed on the first sensing electrodes, the second organic patterns disposed on the second sensing electrodes, and the third organic patterns disposed on the connection parts. Thus, the damage to the first sensing electrodes, the second sensing electrodes, and the connection parts while forming the bridges may be prevented or reduced. Therefore, the touch panel fabricated by the method for fabricating the touch panel according to the exemplary embodiment may have improved touch reliability compared to the conventional touch panel fabricated by the conventional method for fabricating the touch panel.

Also, in the method for fabricating the touch panel according to the embodiment, the metal layer and the silver nano wire layer may be etched through a single process to simplify the fabricating process.

According to the embodiment, the touch panel may have simplified fabrication process and improved reliability. According to the embodiment, the method of fabricating the touch panel may have simplified fabrication process and improved reliability.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A method for fabricating a touch panel, the method comprising:
   providing a silver nano wire layer;
   providing first organic patterns and second organic patterns on the silver nano wire layer;
   providing a metal layer on the first organic patterns and the second organic patterns;
   forming a first bridge layer, first sensing electrodes, and second sensing electrodes by etching the metal layer and the silver nano wire layer;
   providing a transparent conductive oxide layer on the first organic patterns, the second organic patterns, the first bridge layer, the first sensing electrodes, and the second sensing electrodes; and
   forming a second bridge layer by etching the transparent conductive oxide layer.

2. The method of claim 1, wherein the metal layer and the silver nano wire layer are etched through a single etching process.

3. The method of claim 1, wherein the providing of the first organic patterns and the second organic patterns comprises:
   providing an organic layer;
   providing a first photoresist layer on the organic layer;
   etching the first photoresist layer using a first mask to form first photoresist patterns; and
   etching the organic layer using the first photoresist patterns as a mask to form the first organic patterns and the second organic patterns.

4. The method of claim 1, wherein the forming of the first bridge layer, the first sensing electrodes, and the second sensing electrodes comprises:
   providing a second photoresist layer on the metal layer;
   etching the second photoresist layer using a second mask to form second photoresist patterns; and
   etching the metal layer and the transparent conductive oxide layer using the second photoresist patterns as a mask to form the first bridge layer, the first sensing electrodes, and the second sensing electrodes.

5. The method of claim 1, wherein the forming of the second bridge layer comprises:
   providing a third photoresist layer on the transparent conductive oxide layer;
   etching the third photoresist layer using a third mask to form third photoresist patterns; and
   etching the transparent conductive oxide layer using the third photoresist patterns as a mask to form the second bridge layer.

6. The method of claim 1, wherein, in the forming of the first bridge layer, the first sensing electrodes, and the second sensing electrodes, each of the first sensing electrodes corresponds to each of the first organic patterns, and each of the second sensing electrodes corresponds to each of the second organic patterns.

* * * * *